A. HALLAWAY.
RAKE CLEANER.
APPLICATION FILED SEPT. 5, 1913.
1,099,247.
Patented June 9, 1914.
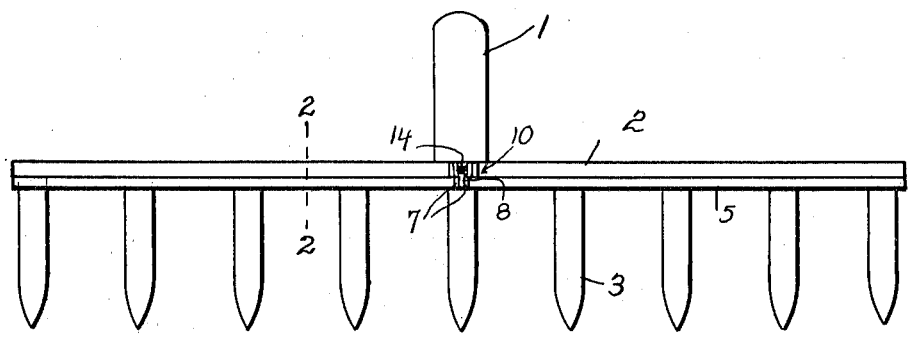
Fig.1.
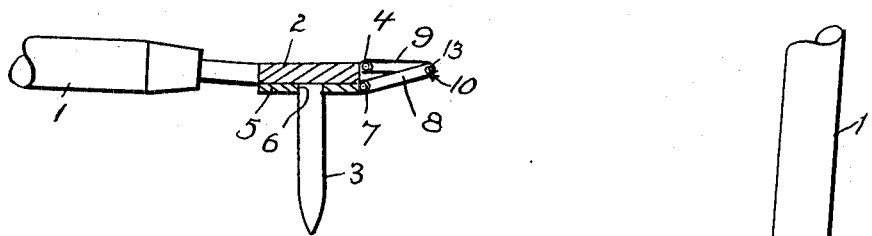
Fig.2.
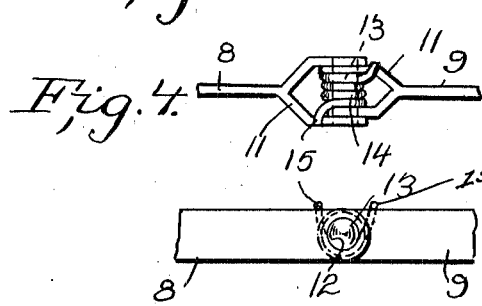
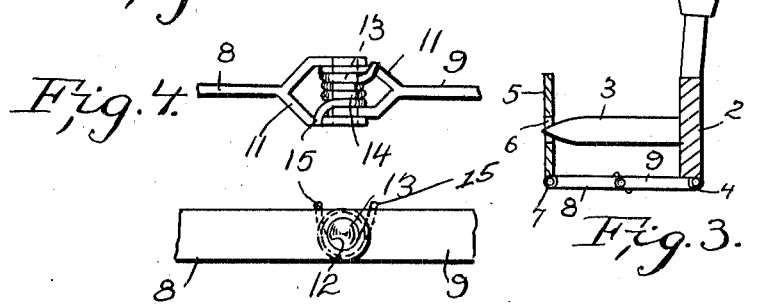
Fig.4.
Fig.5.
Fig.3.
Witnesses
Inventor
A. Hallaway.
By
Attorney

UNITED STATES PATENT OFFICE.

ARTHUR HALLAWAY, OF WEST LEBANON, NEW YORK.

RAKE-CLEANER.

1,099,247.

Specification of Letters Patent.

Patented June 9, 1914.

Application filed September 5, 1913. Serial No. 788,341.

*To all whom it may concern:*

Be it known that I, ARTHUR HALLAWAY, a citizen of the United States, residing at West Lebanon, in the county of Columbia and State of New York, have invented certain new and useful Improvements in Rake-Cleaners; and I do hereby declare the following to be a full, clear, and exact description of the invention, such as will enable others skilled in the art to which it appertains to make and use the same.

This invention relates to new and useful improvements in rakes and has for its object the provision of a device which will automatically clean the teeth of the rake at the will of the operator.

Another object of my invention is the provision of such device which will permit the operator of a rake to strip the teeth of any undesirable matter without changing his position with relation to the handle.

A further object of my invention is the provision of such a device which may be easily and cheaply constructed, quickly operated and durable in use.

With the above and other objects in view I will now proceed to describe my invention in the following specification and accompanying drawings, in which, Figure 1 is a front view of a rake showing my improved cleaning attachment applied thereto, Fig. 2 is a transverse sectional view taken on line 2—2 of Fig. 1, and showing the stripping bar in its raised position, Fig. 3 is a view similar to Fig. 2, showing the stripping bar, as it would appear, in its lowered position, Fig. 4 is a detail plan view of the spring which is adapted to return the stripping bar to its raised position, and Fig. 5 is a side view of Fig. 4.

Referring to the drawings by characters of reference 1 indicates a rake handle, of the ordinary construction, having formed at the lower end thereof the suitable rake head 2, which in turn carries the rake teeth 3. Formed integrally with the rake head intermediate its ends I preferably provide the outstanding ear 4 which is provided with an aperture, the use of which will be more fully hereinafter described.

My improved cleaning device preferably comprises the stripping bar 5 having formed therein the apertures 6, which are adapted to receive the ends of the rake teeth 3, when the device is in place. Formed integrally with the forward edge of the stripping bar 5 I preferably provide a suitable ear 7 which is provided with a suitable aperture, the use of which will be more fully hereinafter described.

A suitable link 8 is hingedly secured to a link 9 as clearly shown at 10 and the opposite end of each link is secured to one of the ears 4 or 7, as clearly illustrated, by means of a pin which is adapted to extend through the apertures in the ears and through suitable apertures in the links, thereby forming a hinge joint which will permit the stripping bar 5 to slide downwardly with relation to the rake teeth and thereby force any trash or litter which may have gathered thereon from the ends of said rake teeth, thus leaving the same free.

The joint, referred to as 10, is shown in detail in Figs. 4 and 5 and preferably comprises the U-shaped members 11 which are formed at the ends of the links 8 and 9. These U-shaped members 11 are preferably provided with the centrally located apertures 12 through which a suitable pin 13 is adapted to extend. Surrounding the pin 13 I preferably provide the coil spring 14, the ends of which are bent, as clearly illustrated at 15, and adapted to exert pressure in opposite directions against each of the links 8 and 9. Thus, it will be seen that said links will be normally held in the closed position illustrated in Fig. 2, and the stripping bar will be held normally raised as shown in the same figure.

It will be apparent from the foregoing that when it is desired to make use of my improved rake cleaner the only operation necessary is the placing of the rake in the position illustrated in Fig. 3. Thus, it will be seen that the links 8 and 9 will tend to straighten and in doing so the stripping bar 5 will be forced toward the ends of the rake teeth and it will be obvious that any trash, litter or the like will be forced from the ends of said teeth, thus leaving the same perfectly clean.

While in the foregoing I have shown and described the preferred embodiment of my invention I wish it to be understood that I may change the specific arrangement and combination of parts, without in any way departing from the spirit and scope of my invention as defined in the appended claim.

What is claimed is:—

In combination with a rake having a handle, a head, and teeth secured to said head, a link pivotally secured to the head and extending forwardly with relation thereto, the outer end of said link being forked, a second link pivotally secured to the forked end of the aforesaid link, a spring adapted to coöperate with the forked member on the link to normally hold the two links in their closed position and a stripping bar having teeth receiving apertures therein slidably mounted on the teeth and pivotally secured to the free end of the second link, whereby when pressure is exerted against the end of the link, the stripping bar will be forced toward the ends of the teeth and thereby clean the same of any foreign substance.

In testimony whereof I affix my signature in presence of two witnesses.

ARTHUR HALLAWAY.

Witnesses:
CHAS. E. O'NEILL,
GRACE HALLAWAY.

Copies of this patent may be obtained for five cents each, by addressing the "Commissioner of Patents, Washington, D. C."